United States Patent
Allen

(10) Patent No.: US 9,436,954 B2
(45) Date of Patent: *Sep. 6, 2016

(54) MODIFIED QUEUE LIST GENERATION

(71) Applicant: International Business Machines Corporation, Armonk, NY (US)

(72) Inventor: Ira L. Allen, Dallas, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/072,754

(22) Filed: Mar. 17, 2016

(65) Prior Publication Data

US 2016/0196597 A1  Jul. 7, 2016

Related U.S. Application Data

(63) Continuation of application No. 14/041,791, filed on Sep. 30, 2013, now Pat. No. 9,317,874, which is a continuation of application No. 12/820,317, filed on Jun. 22, 2010, now Pat. No. 8,589,819.

(51) Int. Cl.
  *G06Q 30/02* (2012.01)
  *G06Q 10/06* (2012.01)

(52) U.S. Cl.
  CPC ...... *G06Q 30/0281* (2013.01); *G06Q 10/0631* (2013.01)

(58) Field of Classification Search
  None
  See application file for complete search history.

(56) References Cited

U.S. PATENT DOCUMENTS

| | | |
|---|---|---|
| 5,999,088 A | 12/1999 | Sibbitt |
| 6,529,786 B1 | 3/2003 | Sim |
| 6,542,751 B1 | 4/2003 | Blink et al. |
| 8,589,819 B2 | 11/2013 | Allen |
| 8,718,615 B2 | 5/2014 | Ben-Alexander |
| 8,781,092 B2 | 7/2014 | Noble, Jr. |
| 2003/0061078 A1 | 3/2003 | Shimosako et al. |
| 2003/0103619 A1 | 6/2003 | Brown et al. |
| 2003/0108186 A1 | 6/2003 | Brown et al. |
| 2005/0157865 A1 | 7/2005 | Yeager et al. |
| 2005/0200455 A1 | 9/2005 | Veni, III et al. |
| 2005/0271199 A1 | 12/2005 | Collins, Jr. |
| 2006/0017542 A1 | 1/2006 | Holloway et al. |
| 2006/0273920 A1 | 12/2006 | Doan et al. |
| 2007/0047720 A1 | 3/2007 | Brandt et al. |
| 2007/0116231 A1 | 5/2007 | DeGraaff et al. |
| 2007/0219816 A1 | 9/2007 | Van Luchene et al. |
| 2008/0086377 A1 | 4/2008 | Jain |
| 2009/0055208 A1 | 2/2009 | Kaiser |
| 2009/0203382 A1 | 8/2009 | Walter |
| 2010/0303226 A1 | 12/2010 | Kradjel et al. |
| 2011/0314417 A1 | 12/2011 | Allen |
| 2014/0025600 A1 | 1/2014 | Allen |

OTHER PUBLICATIONS

Notice of Allowance (Mail Date Jan. 21, 2016) for U.S. Appl. No. 14/041,791, filed Sep. 30, 2013; Confirmation No. 4108.
Office Action (Mail Date Jul. 18, 2012) for U.S. Appl. No. 12/820,317, filed Jun. 22, 2010; Confirmation No. 1939.
Amendment filed Sep. 25, 2012 in response to Office Action (Mail Date Jul. 18, 2012) for U.S. Appl. No. 12/820,317, filed Jun. 22, 2010; Confirmation No. 1939.
Final Office Action (Mail Date Jan. 4, 2013) for U.S. Appl. No. 12/820,317, filed Jun. 22, 2010; Confirmation No. 1939.
Request for Continued Examination and Amendment filed Mar. 13, 2013 in response to Final Office Action (Mail Date Jan. 4, 2013) for U.S. Appl. No. 12/820,317, filed Jun. 22, 2010; Confirmation No. 1939.
Notice of Allowance (Mail Date Jul. 10, 2013) for U.S. Appl. No. 12/820,317, filed Jun. 22, 2010; Confirmation No. 1939.

*Primary Examiner* — Asher Kells
(74) *Attorney, Agent, or Firm* — Schmeiser, Olsen & Watts; Matthew Chung

(57) ABSTRACT

A queuing method and system. The method includes retrieving by a computer processor of a stationary computing system or a computing device, queue data placing an individual onto an initial queue list for receiving a service and ID data identifying the individual. The computer processor presents a status of the individual with respect to the queue list. The computer processor receives a request associated with the service and in response presents options for the individual. The computer processor receives a selection for an option and generates a modified queue list.

20 Claims, 6 Drawing Sheets

```
                                                            500a
┌─────────────────────────────────────────────────────────────┐
│ Hello John Doe                                              │
│ You are 5th in line for an outside table. Your estimated wait time is 25 minutes. │
│ An inside table near the fountain is currently available.   │
│ During your last visit, you indicated a pleasant experience at this table. │
│ Please select a choice within 3 minutes:                    │
│         ☐ Accept inside table                               │
│         ☐ Decline inside table                              │
└─────────────────────────────────────────────────────────────┘
```

FIG. 5A

```
                                                            500b
┌─────────────────────────────────────────────────────────────┐
│ Your table is ready. Please proceed to the following table marked with a X: │
│              Fountain                                       │
│         ☒    ○    ☐                                         │
│         ☐                                                   │
│         ☐                                                   │
│         ☐ Your are here                                     │
└─────────────────────────────────────────────────────────────┘
```

FIG. 5B

```
                                                            500c
┌─────────────────────────────────────────────────────────────┐
│ Hello John Doe                                              │
│ Welcome back. Our desert special of the day is selling quickly and we │
│ anticipate a sellout.                                       │
│ You have previously ordered this desert several times.      │
│ Would you like to reserve this desert now?                  │
│ Please select a choice within 3 minutes:                    │
│          ☐ Preorder desert                                  │
│          ☐ Do not preorder desert                           │
└─────────────────────────────────────────────────────────────┘
```

FIG. 5C

MODIFIED QUEUE LIST GENERATION

RELATED CASES

This application is a continuation application claiming priority to Ser. No. 14/041,791 filed Sep. 30, 2013 which is a continuation application claiming priority to Ser. No. 12/820,317 filed Jun. 22, 2010 now U.S. Pat. No. 8,589,819 issued Nov. 19, 2013.

FIELD

The present invention relates to a method and associated system for managing a queue position for an individual.

BACKGROUND

Managing a customer position with respect to additional customers associated with a business comprises an inefficient process with little flexibility. A customer is typically positioned without any regard to additional factors. Positioning a customer without regard to additional factors may result in a time consuming process.

SUMMARY

The present invention provides a method comprising: retrieving, by a computer processor of a computing device from a computing system, queue data placing an individual onto an initial queue list indicating an order with respect to additional individuals for an entity providing a service for the individual, wherein the initial queue list is stored within a first memory queue; retrieving, by the computer processor, ID data identifying the individual; presenting, by the computer processor to the individual, a status of the individual with respect to the queue list; receiving, by the computer processor from the individual, a request associated with the service; presenting, by the computer processor to the individual in response to the request, options for the individual and a specified amount of time for responding to the options, wherein the options are associated with the service and the queue list; receiving, by the computer processor from the individual in response to the options, a selection for a first option of the options; and generating, by the computer processor based on the selection for the first option, a modified queue list from the initial queue list, wherein the modified queue list indicates a modified order for the individual with respect to the additional individuals for providing the service for the individual.

The present invention provides a method comprising: retrieving, by a computer processor of a central computing system from a computing device, queue data associated with an individual; placing, by the computer processor in response to the retrieving the queue data, the individual onto an initial queue list indicating an order with respect to additional individuals for an entity providing a service for the individual, wherein the initial queue list is stored within a first memory queue; retrieving, by the computer processor, ID data identifying the individual; transmitting, by the computer processor to the computing device, a status of the individual with respect to the queue list, wherein the computing device presents the status to the individual; receiving, by the computer processor from the individual, a request associated with the service; determining, by the computer processor in response to the request, options for the individual and a specified amount of time for responding to the options, wherein the options are associated with the service and the queue list; transmitting, by the computer processor to the computing device, the options and the specified amount of time, wherein the computing device presents to the individual, the options and; receiving, by the computer processor from the individual in response to the options, a selection for a first option of the options; and generating, by the computer processor based on the selection for the first option, a modified queue list from the initial queue list, wherein the modified queue list indicates a modified order for the individual with respect to the additional individuals for providing the service for the individual.

The present invention provides a method comprising: retrieving, by a computer processor of a central computing system from a computing device, queue data associated with an individual; placing, by the computer processor in response to the retrieving the queue data, the individual onto an initial queue list indicating an order with respect to additional individuals for an entity providing a service for the individual, wherein the initial queue list is stored within a first memory queue; retrieving, by the computer processor, ID data identifying the individual; transmitting, by the computer processor to the computing device, a status of the individual with respect to the queue list, wherein the computing device presents the status to the individual; analyzing, by the computer processor, data associated with the service; generating, by the computer processor based on the results of the analyzing, options for the individual and a specified amount of time for responding to the options, wherein the options are associated with the service and the queue list, wherein the computing device presents the options and the specified amount of time to the individual; receiving, by the computer processor from the individual, a selection for a first option of the options; and associating, by the computer processor for the individual based on the selection, the first option with the service and the individual.

The present invention advantageously provides a simple method and associated system capable of managing a customer position with respect to additional customers.

BRIEF DESCRIPTION OF THE DRAWINGS

FIGS. 5A-5C illustrate restaurant implementation screen shots for one of the devices of FIG. 1, in accordance with embodiments of the present invention.

DETAILED DESCRIPTION

Figure 1:
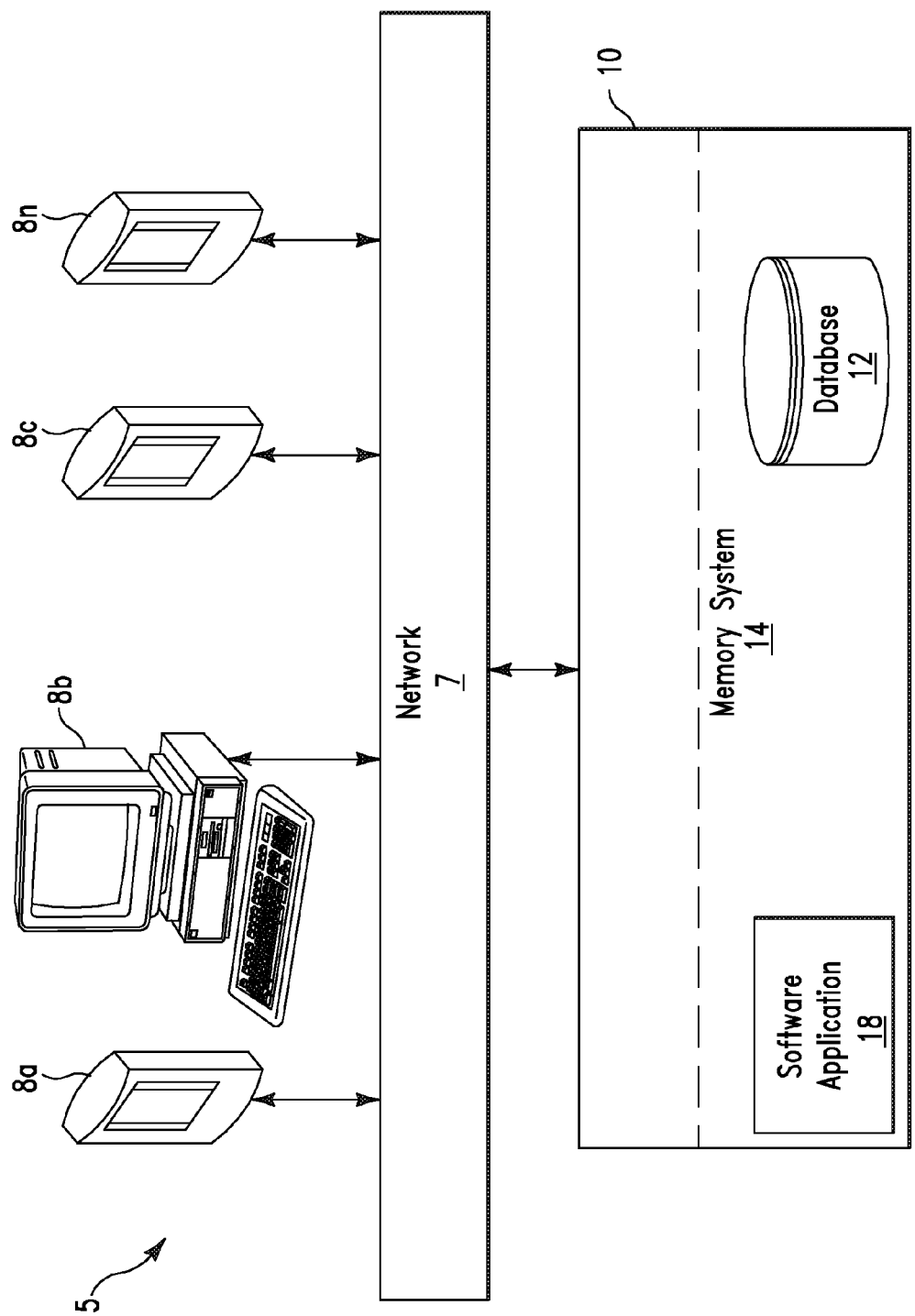
FIG. 1 illustrates a system for managing a queue position for an individual, in accordance with embodiments of the present invention.

FIG. 1 illustrates a system 5 for managing a queue position for an individual, in accordance with embodiments of the present invention. System 5 allows a user (e.g., a patron associated with a business) to select options that allow him/her to interactively select different choices and options associated with delivery of a service or product which may in turn have an impact on an amount of time spent in a service (or product queue) queue. A queue is defined herein as a memory system that selectively places customer identifiers (i.e., associated with customers for a product or service) in a selective order (to receive the product or service) based on various factors (e.g., a time of arrival, customer preferences, customer selections, etc). System 5 provides real time status updates associated with customer progress with respect to moving up in a queue. System 5 enables a process for shortening a time period initiated when a customer accesses (e.g., via a Website or online application) or arrives at a servicing queue until an order is placed. System 5 allows a customer to initiate an engagement process before an actual interaction with a service provider. The following steps describe an implementation example enabled by system 5 of FIG. 1:

1. A customer (with a party) accesses (e.g., via a Website) or arrives at a check-in station at a restaurant.
2. A host/hostess captures a number of individuals in the party, customer preferences, and a frequent customer identifier.
3. The host/hostess uploads the information (captured in step 2) to a computing system (e.g., computing system 10 in FIG. 1) and gives a computing device (e.g., one of computing devices 8a . . . 8n in FIG. 1 connected wirelessly to the computing system) to the customer.
4. An approximate wait time (in a queue) for a table is continuously updated (e.g., by the computing system) and presented to the customer via the computing device. While the customer is awaiting notification for an available table, he/she may (via the computing device): check wait time; pursue a special of the day; view a current menu, indicate a question about a particular item, etc. If the customer is a repeat customer, the computing system may retrieve prior orders and preferences for the customer.
5. When a table is available for the customer, the host/hostess may enable an entry in the queue for the table and the computing device indicates that it is time to approach the check in station. If the computing device (e.g., a handheld computing device) senses that a specified perimeter has been crossed (e.g., the customer has left the restaurant), the computing device may be triggered to set off an alarm (e.g., a low volume beep and bright flash). If the customer does not respond, an audible level and brightness (i.e., for the alarm) may increase incrementally.

System 5 of FIG. 1 comprises computing devices 8a . . . 8n connected through a network 7 to a computing system 10. Computing devices 8a . . . 8n may comprise any type of computer controlled wireless handheld device (as illustrated by 8a, 8c, and 8n) such as, inter alia, a PDA, a cellular telephone, a laptop computer, a tablet computer, etc. Alternatively, computing devices 8a . . . 8n may comprise any type of stationary central computer controlled device (as illustrated by 8b) such as, inter alia, a kiosk, etc. Network 7 may comprise any type of network including, inter alia, a local area network, (LAN), a wide area network (WAN), the Internet, a wireless network, etc. Computing system 10 may comprise any type of computing system(s) including, inter alia, a personal computer (PC), a server computer, a database computer, a controller, etc. Computing system 10 comprises a memory system 14. Memory system 14 may comprise a single memory system. Alternatively, memory system 14 may comprise a plurality of memory systems. Memory system 14 comprises a software application 18 and a database 12. Database 12 comprises all retrieved customer information and queue positions. Software application 18 enables a method to:

1. Retrieve customer information.
2. Place a customer in a queue for receiving a service or product.
3. Update the customer as to a status or position in the queue.
4. Present options to the customer with respect to the product or service.
5. Receive selections from the customer.
6. Advise the customer that he/she is next for the product or service.
7. Direct the customer to a specified location for receiving the product or service.

System 5 may enable a queuing method with respect to a customer wait time for any type of product or service. For example, system 5 may enable a preprocessing method with respect to: a customer wait for a restaurant table, a shopping trip within a grocery store, a doctor/dentist waiting room, etc. The following implementation examples describe various preprocessing scenarios enabled by system 5 of FIG. 1:

EXAMPLE 1

In a restaurant scenario, a frequent customer accesses a check-in station (e.g., arrives at a check-in station at the restaurant or logs-in via a Website or an online application) and an identifier for the customer is placed in a queue for a table. The customer is given a handheld computing device or is asked to login to a stationary computing device (e.g., one of computing devices 8a . . . 8n) indicating a place in line (e.g., fifth place) and an estimated wait time for a requested table (e.g., an outside table). A choice for an alternative table (e.g., an indoor table) may be given to the customer (i.e., via the computing device) based on preferences from a past visit. The customer is given a limited time period (e.g., 2 minutes) to make a selection. While waiting for the table, the customer may be presented with a customized menu (i.e., via the computing device) with meal suggestions based upon a profile for the customer (e.g., preference or dietary). The customized menu is dynamically updated as daily meal specials begin to run out of stock. For example, if the customer is a frequent client of the restaurant, system 5 presents (to the customer via one of computing devices 8a . . . 8n) an ability to select or reserve a specific meal (e.g., a desert that has been previously ordered and is running out of stock) before sitting down at the table. System 5 prioritizes service to frequent customers even if they have not been seated. When a table is ready (i.e., for the customer), directions to the table may be presented to the user via the device.

EXAMPLE 2

In an automobile service scenario, a customer brings a vehicle into a service center for a specified service (e.g., an oil change for the vehicle) and the customer is given a handheld computing device (e.g., one of handheld computing devices 8a . . . 8n) or logs into a stationary computing device (e.g., a kiosk). While the specified service is being performed, another unrelated issue (e.g., a leak in the windshield washer fluid tank) with the vehicle is detected (i.e., by an automotive technician working on the vehicle). In response, the technician updates the work order (i.e., via computing system 10). Computing system automatically transmits (i.e., to the handheld computing device) a message (i.e., to the customer) indicating the additional work, pricing necessary for repairing the vehicle (i.e., due to the unrelated issue with the vehicle) and an estimated wait time. In response, the customer may immediately approve the additional work (via the handheld computing device) or request (via the handheld computing device) a meeting with the technician and/or a service advisor to discuss the additional repairs. If the customer immediately approves the additional work, he/she is placed in a queue for processing the service request and is presented with an estimated wait time (e.g., 15 minutes). If the customer requests a meeting with the technician and/or a service advisor to discuss the additional repairs for processing, he/she is placed in a queue for processing the meeting request and is presented with an estimated total wait time for discussing with technician and/or a service advisor, approving repair, and repair time (e.g., 60 minutes). If the customer elects to decline the extra service, he/she may be informed that the vehicle is currently ready for pickup and may be directed to a cashier for checkout.

EXAMPLE 3

In a medical clinic scenario, a patient accesses a check-in station and an identifier for the customer is placed in a queue. As a first example, the patient arrives at an actual check-in station at a medical clinic. As a second example, the patient logs-in (remotely from a remote location such as, inter alia, home) via a Website or an online application and the patient is directed to a specified geographical location (e.g., a hospital, a clinic, etc) and a location within the geographical location (e.g., a specified room or area). The patient is given (i.e., when arriving at the check-in station or location) a handheld computing device (e.g., one of handheld computing devices $8a$ ... $8n$) and preliminary data (e.g., current medications, current symptoms, current illnesses, etc) is captured via the handheld computing device. In response, computing system 10 offers the patient selections associated with a place or time in a queue and the patient is presented with associated wait times for each choice. For example, the patient (e.g., based a medical history and symptoms/reasons for the visit) may be given a choice to be seen by the by a nurse practitioner (or physician's assistant) in about 15 minutes; wait to see a different doctor in 30 minutes; or wait to see a preferred doctor in 45 minutes. If the patient chooses to see the nurse practitioner first (and after the nurse practitioner examines the patient) and the nurse practitioner determines that the patient will need to see the doctor, the wait time will 30 minutes (i.e., there is no penalty to see the nurse practitioner first).

EXAMPLE 4

In an airport scenario, a standby traveler (i.e., the traveler is on standby waiting for a flight to a specified location) accesses a check-in counter and an identifier for the customer is placed in a queue. As a first example, the traveler arrives at an actual check-in station at the airport. As a second example, the traveler logs-in (remotely from a remote location such as, inter alia, home) via a Website or an online application and the traveler is directed to a specified geographical location (e.g., an airport, etc) and a location within the geographical location (e.g., a specified gate). The traveler is given (i.e., when arriving at the check-in station or location) a handheld computing device (e.g., one of handheld computing devices $8a$ ... $8n$). As various flight scenarios unfold, the computing system 10 presents to the traveler via the handheld computing device different options. For example, flights to alternate airports with reasonable driving distance to the specified location, a guaranteed seat on a later flight, seats open up on a flight, this provides an ability able to move around the airport verses staying at one gate, etc. The computing system 10 provides these options to the traveler who then may select any of the different options via the handheld computing device.

EXAMPLE 5

In grocery store scenario, a customer accesses a service desk and an identifier for the customer is placed in a queue. As a first example, the customer arrives at an actual check-in station at the grocery store. As a second example, the customer logs-in (remotely from a remote location such as, inter alia, home) via a Website or an online application and the customer is directed to a specified geographical location (e.g., a specific store) and a location within the geographical location (e.g., a deli counter). The customer is given (i.e., when arriving at the service or location) a handheld computing device (e.g., one of handheld computing devices $8a$ ... $8n$). The customer submits (i.e., via the handheld computing device) an order to the deli counter (cold cut types and amounts, thickness of slices, etc) and enters into a queue. In the meantime, the customer shops for additional items throughout the store. Additionally, computing system 10 may modify a request. For example, if the customer has requested a particular brand of roasted turkey and it runs out before their order is processed in the queue, system 5 transmits to a customer notification and some suggested alternatives, In response, the customer indicates their revised choice (i.e., via a handheld computing device) and computing system 10 the customer in their current the position of the service queue. If the client decides they need to see the choices, the client indicates this and the Computing System 10 advises them approx. how much time until their position in the queue will be $1^{st}$, so that the client can determine when to start making their way to the counter. When the deli order is complete, the customer is notified via the handheld computing device.

Figure 2:
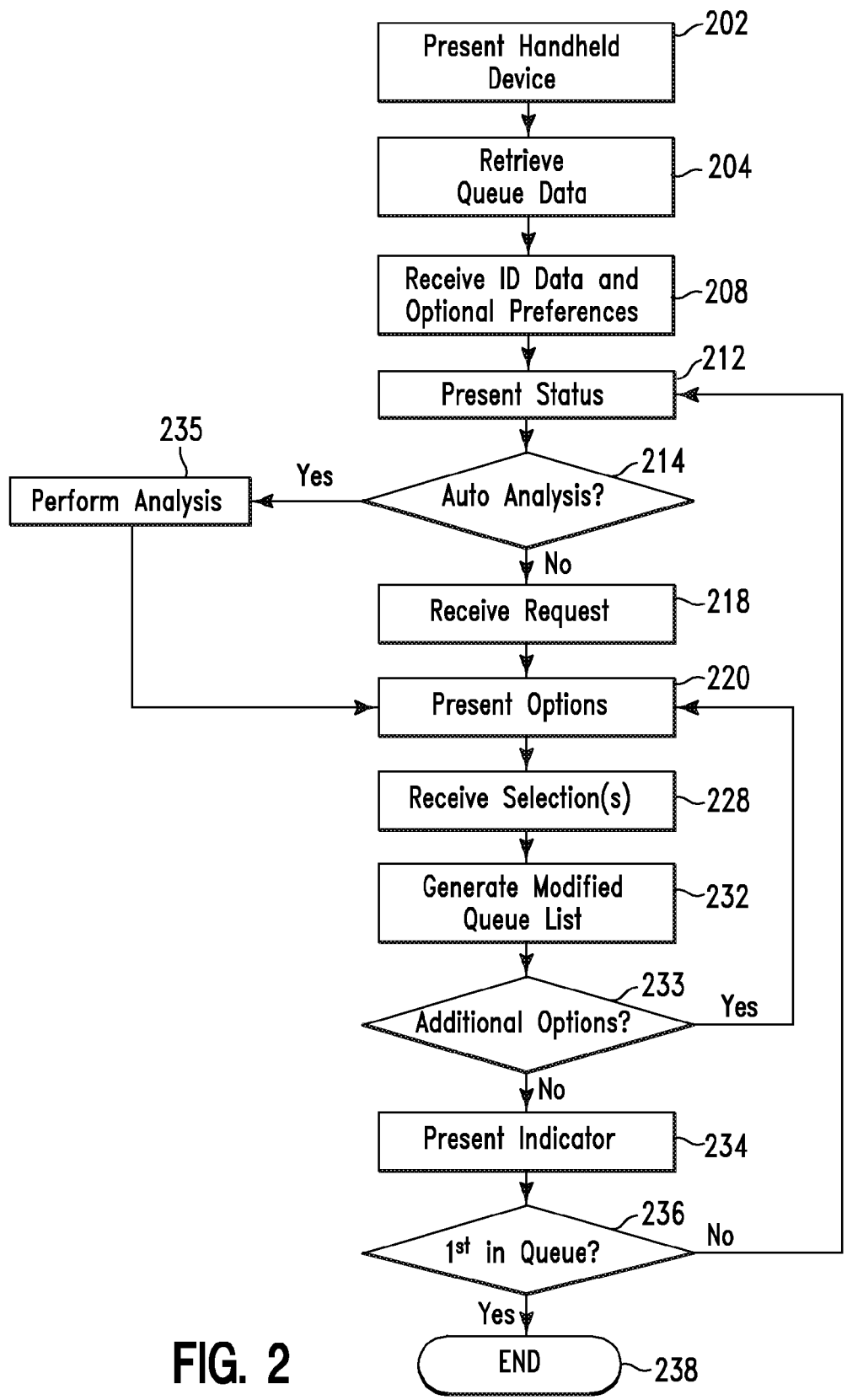
FIG. 2 illustrates a flowchart describing an algorithm used by the system of FIG. 1 for managing a queue position for an individual, in accordance with embodiments of the present invention.

FIG. 2 illustrates a flowchart describing an algorithm used by system 5 of FIG. 1 for managing a queue position for an individual, in accordance with embodiments of the present invention. In step 202, a computing device (e.g., one of computing devices $8a$ ... $8n$) is given to an individual requesting a service from an entity. The request for service may be entered via a check-in station or remotely via a Website or online application. Alternatively, the customer may log into a stationary computing device (e.g., a kiosk). In step 204, a computer processor of the device or a computing system (e.g., computing system 10 in FIG. 1) retrieves queue data placing the individual onto a queue list. The queue list indicates an order with respect to additional individuals for the entity providing a service for the individual. The queue list is stored within a memory queue located within the computing device or the computing system. In step 208, the computer processor (i.e., for the hand held device and/or the computing system) retrieves identification (ID) data identifying the individual. Additionally, the computer processor may retrieve user preferences for the individual. For example, if the individual is a frequent customer of the entity, the user preferences may be derived for a user profile comprising past service options used or preferred by the individual. In step 212, the computer processor presents (to the individual) a status of the individual with respect to the queue list (e.g., a place in the queue and or an amount of time until the individual will be at the top of the queue for the service). In step 214, it is determined if an auto analysis (i.e., associated with changing a place in the queue for the individual) will be performed.

If in step 214, it is determined that an auto analysis (i.e., associated with changing a place in the queue for the individual) will be performed then in step 235, an auto analysis is performed and in step 220, options (based on results of the auto analysis) are presented to the individual as described, infra. The auto analysis process includes using a user profile and/or preferences (e.g., from past user selections) to automatically present options with respect to adjusting a placement in the queue. For example (in a restaurant scenario), results of the auto analysis process may indicate (i.e., based on past menu selections) that the individual may prefer to preorder a specific meal type and in response the individual is presented with the option of preordering a specific meal type while waiting in the queue.

If in step 214, it is determined that an auto analysis (i.e., associated with changing a place in the queue for the individual) will not be performed then in step 218, the computer processor receives (i.e., from the individual) a request associated with the service. For example (in a restaurant scenario) the individual may request to view (i.e., via the computing device) a menu while waiting in the queue. In step 220, the computer processor presents (i.e., to the individual based on the request in step 218 or the results of the auto analysis process in step 235) options for the individual. The options are associated with the service and adjusting a placement in the queue. In step 228, the computer processor receives (from the individual in response to the options presented in step 220) a selection for an option of the options. In step 232, the computer processor generates (i.e., based on the selection of the option) a modified queue list from the initial queue list. The modified queue list indicates a modified order for the individual with respect to the additional individuals (i.e., for providing the service or a modified service for the individual). In step 233, it is determined if additional options may be presented to the individual (i.e., associated with the service and adjusting a placement in the queue). If in step 233, it is determined that additional options may be presented to the individual then step 220 is repeated to present more options to the individual. If in step 233, it is determined that additional options will not be presented to the individual then in step 234, the modified queue list indicates that the service may be currently provided for the individual. In response, the computer processor presents (to the individual) an indicator (e.g., audio and/or visual indicator) indicating that the service may be currently provided for the individual. The indicator may be presented several different times at several different levels based on a response time of the individual. Additionally, the computer processor may present (to the individual) instructions advising the individual to go to a specified location (e.g., a specified examination room in a physician's office) with respect to receiving the service. In step 236, it is determined if the individual is at the top of the queue list (i.e., first in the queue). If in step 236, it is determined that the individual is not at the top of the queue list then steps 212-234 are repeated to determine a status of the individual with respect to the queue list and present additional options. If in step 236, it is determined that the individual is at the top of the queue list then the individual is presented with a service and the process terminates.

Figure 3:
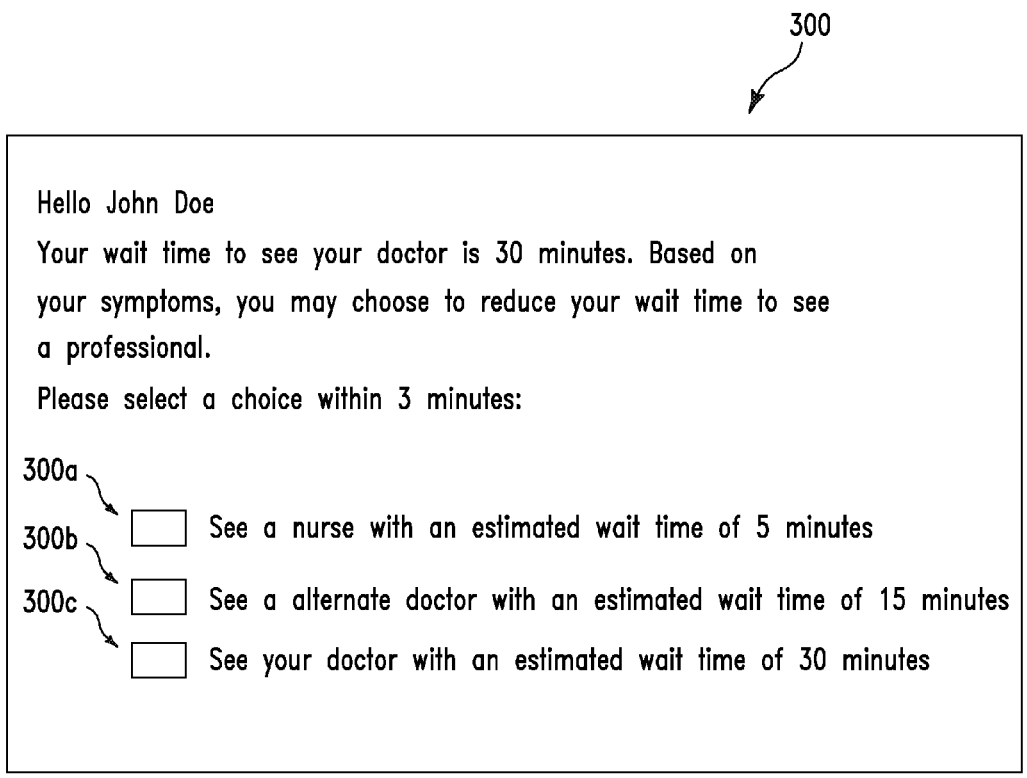
FIG. 3 illustrates a doctor visit implementation screen shot for one of the devices of FIG. 1, in accordance with embodiments of the present invention.

FIG. 3 illustrates a screen shot 300 for one of devices 8a . . . 8n of FIG. 1, in accordance with embodiments of the present invention. Screen shot 300 describes a medical clinic implementation example where a patient accesses (remotely) or arrives at a check-in station and an identifier for the customer is placed in a queue for medical services. In this example the patient is given three choices 300a, 300b, and 300c and associated wait times (5 minutes, 15 minutes, and 30 minutes) for modifying a queue position.

Figure 4:
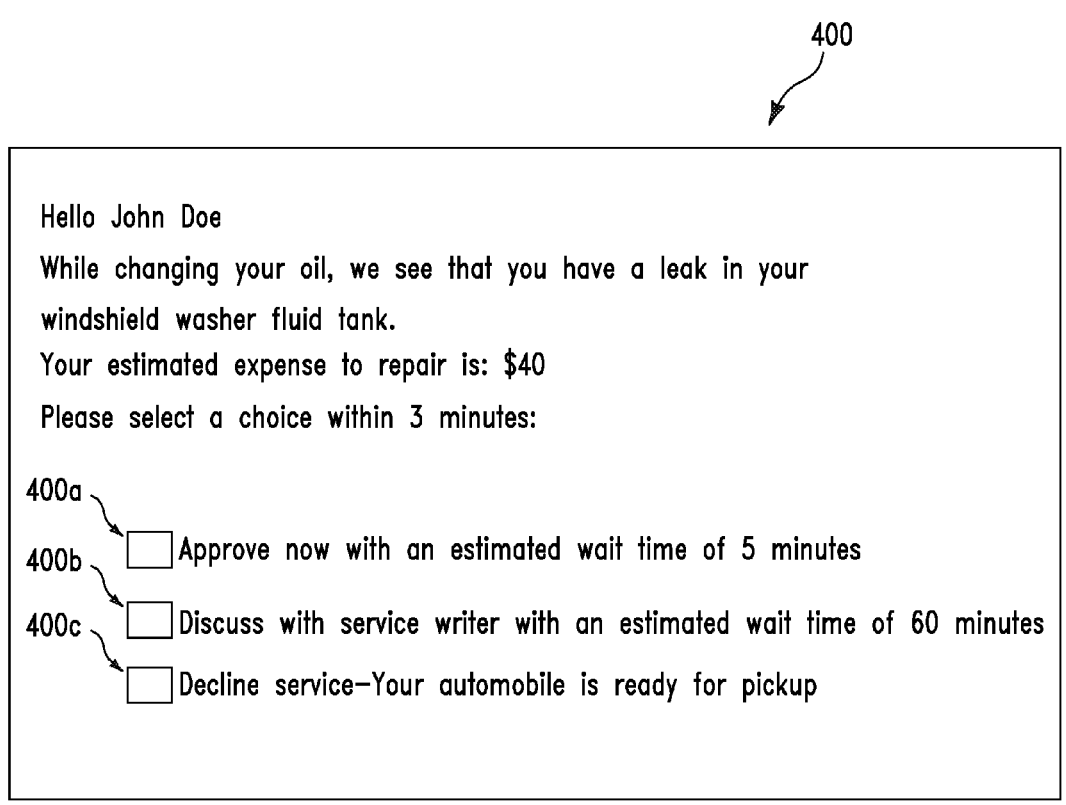
FIG. 4 illustrates an automobile implementation screen shot for one of the devices of FIG. 1, in accordance with embodiments of the present invention.

FIG. 4 illustrates a screen shot 400 for one of devices 8a . . . 8n of FIG. 1, in accordance with embodiments of the present invention. Screen shot 400 describes an automobile service implementation example where a customer brings a vehicle into a service center for a specified service and an additional service is required. In this example the customer is given three choices 400a, 400b, and 400c for modifying a queue position. If choice 400a (i.e., approve now) is selected, then the customer is presented with a wait time of 15 minutes. If choice 400b (i.e., discuss with service advisor) is selected, then the customer is presented with a wait time of 60 minutes. If choice 400c (i.e., decline service) is selected, then the customer is notified that the automobile is ready for pickup and the customer is directed to the cashier.

FIG. 5A illustrates a screen shot 500a for one of devices 8a . . . 8n of FIG. 1, in accordance with embodiments of the present invention. Screen shot 500a describes a first restaurant implementation example where a frequent customer accesses (remotely) or arrives at a check-in station and an identifier for the customer is placed in a queue for a table. The screen shot 500a notifies the customer of his/her place in line and prompts the customer to accept or decline an alternative table.

FIG. 5B illustrates a screen shot 500b for one of devices 8a . . . 8n of FIG. 1, in accordance with embodiments of the present invention. Screen shot 500b describes a second screen for the first restaurant implementation example of FIG. 5A. The screen shot 500c directs the customer (i.e., after accepting an inside table near a fountain) to his/her table thereby eliminating a need for engaging a host/hostess.

FIG. 5C illustrates a screen shot 500c for one of devices 8a . . . 8n of FIG. 1, in accordance with embodiments of the present invention. Screen shot 500c describes a second restaurant implementation example where a frequent customer arrives at a check-in station and an identifier for the customer is placed in a queue for a table. The screen shot 500b prompts the customer to accept or decline a preorder for a fast selling desert based on previously selected orders for the fast selling desert.

Figure 6:
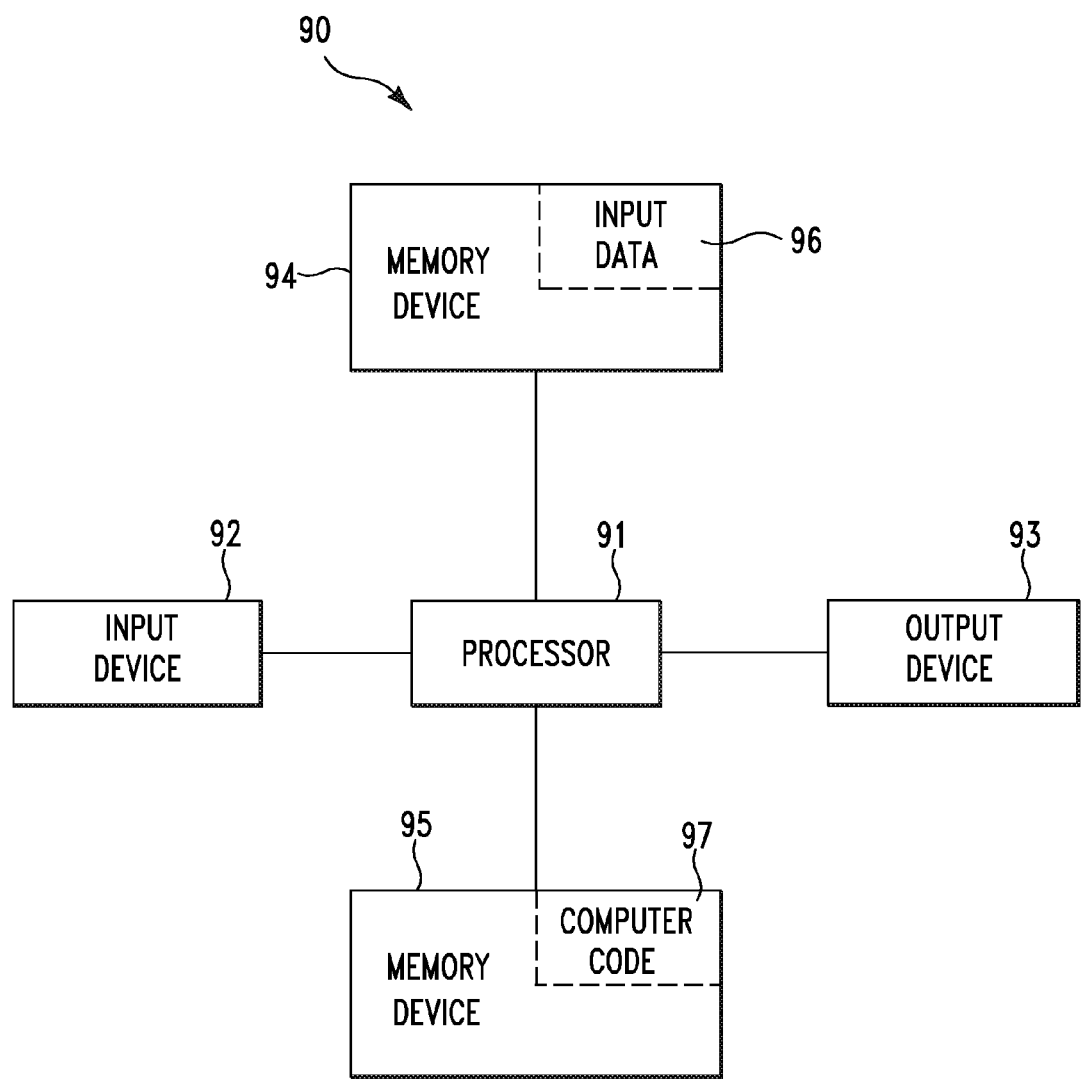
FIG. 6 illustrates a computer apparatus used for managing a queue position for an individual, in accordance with embodiments of the present invention.

FIG. 6 illustrates a computer apparatus 90 (e.g., computing devices 8a . . . 8n or computing system 10 of FIG. 1) used for managing a queue position for an individual, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for managing a queue position for an individual. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 6) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service provider who offers to manage a queue position for an individual. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for managing a queue position for an individual. In another embodiment, the invention provides a method that performs the process steps of the invention on a subscription, advertising, and/or fee basis. That is, a service provider, such as a Solution Integrator, could offer to manage a queue position for an individual. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method comprising:
   retrieving, by a computer processor of a computing device from a computing system, queue data placing an individual onto an initial queue list indicating an order with respect to additional individuals for an entity providing a service for said individual, wherein said service is provided for said individual at a single location associated with said entity, wherein said individual is currently located at said single location for said receiving said service, and wherein said initial queue list is stored within a first memory queue;
   presenting, by said computer processor to said individual in response to a request associated with said service, options for said individual and a specified amount of time for responding to said options, wherein said options are associated with different wait times for receiving said options, wherein said options are associated with said service, previous experiences associated with said individual and said entity, different individuals for performing alternative services differing from and associated with said service, and said initial queue list, and wherein each option of said options is associated with a different attribute associated with performing said service;
   receiving, by said computer processor from said individual in response to said options, a selection for a first option of said options and a second option of said options, wherein said first option is associated with a first previous experience associated with said individual and said entity, and wherein said second option is associated with a first specified individual for performing an alternative service differing from and associated with said service;
   generating, by said computer processor based on said selection for said first option and said second option, a modified queue list from said initial queue list, wherein said modified queue list indicates a modified order for said individual with respect to said additional individuals for providing said service for said individual; and
   determining, by said computer processor, if a specified perimeter associated with said single location has been crossed by said individual thereby indicating that said individual has left said single location.

2. The method of claim 1, wherein said modified queue list indicates that said service may be currently provided for said individual, and wherein said method further comprises:
   presenting at a first level, by said computer processor to said individual, an indicator indicating that said service may be currently provided for said individual; and
   presenting, by said computer processor to said individual, instructions advising said individual to go to a specified location with respect to receiving said service.

3. The method of claim 2, wherein a first time period has elapsed since enabling said presenting at said first level, and wherein said method further comprises:
   presenting at a second level, by said computer processor to said individual, said indicator indicating that said service may be currently provided for said individual, wherein said second level exceeds said first level.

4. The method of claim 1, further comprising:
   retrieving, by said computer processor, a profile for said individual, wherein said profile comprises a frequent customer identifier for said individual with respect to previous visits to said entity, and wherein said profile further comprises preferences associated with said individual with respect to previous services associated with said previous visits to said entity;
   presenting, by said computer processor to said individual in response to said preferences, additional options associated with said service and said modified queue list; and
   receiving, by said computer processor from said individual in response to said additional options, a selection for an additional option of said additional options.

5. The method of claim 4, wherein said generating said modified queue list is further based on said selection for said additional option.

6. The method of claim 4, further comprising:
   removing, by said computer processor based on said selection for said additional option, said individual from said modified queue list;
   placing, by said computer processor in response to said selection for said additional option and said removing, said individual onto a secondary queue list indicating an order with respect to individuals for said entity providing a secondary service for said individual, wherein said secondary queue list differs from said initial queue list and said modified queue list, and wherein said secondary service differs from said service; and placing, by said computer processor, said secondary queue list within a second memory queue differing from said first memory queue.

7. The method of claim 6, wherein said secondary queue list indicates that said secondary service may be currently provided for said individual, and wherein said method further comprises:

presenting at a first level, by said computer processor to said individual, an indicator indicating that said secondary service may be currently provided for said individual; and presenting, by said computer processor to said individual, instructions advising said individual to go to a specified location with respect to receiving said secondary service.

8. The method of claim 1, further comprising:

placing, by said computer processor, said modified queue list within said first memory queue.

9. The method of claim 1, wherein said computing device comprises a handheld computing device.

10. The method of claim 1, further comprising:

providing at least one support service for at least one of creating, integrating, hosting, maintaining, and deploying computer-readable code in said computing system, wherein the code in combination with the computing system is capable of performing: said retrieving said queue data, said retrieving said ID data, said receiving said request, said presenting said options, said receiving said selection, and said generating.

11. A method comprising:

placing, by a computer processor of a central computing system in response to retrieving queue data associated with an individual, said individual onto an initial queue list indicating an order with respect to additional individuals for an entity providing a service for said individual, wherein said initial queue list is stored within a first memory queue, wherein said service is provided for said individual at a single location associated with said entity, and wherein said individual is currently located at said single location for said receiving said service;

transmitting, by said computer processor to a computing device, a status of said individual with respect to said initial queue list, wherein said computing device presents said status to said individual;

determining, by said computer processor in response to a request associated with said service, options for said individual, wherein said options are associated with said service and said initial queue list;

transmitting, by said computer processor to said computing device, said options and a specified amount of time for responding to said options, wherein said computing device presents to said individual, said options and said specified amount of time, wherein said options are associated with different wait times for receiving said options, wherein said options are associated with said service, previous experiences associated with said individual and said entity, different individuals for performing alternative services differing from and associated with said service, and wherein each option of said options is associated with a different attribute associated with performing said service;

receiving, by said computer processor from said individual in response to said options, a selection for a first option of said options and a second option of said options, wherein said first option is associated with a first previous experience associated with said individual and said entity, and wherein said second option is associated with a first specified individual for performing an alternative service differing from and associated with said service;

generating, by said computer processor based on said selection for said first option and said second option, a modified queue list from said initial queue list, wherein said modified queue list indicates a modified order for said individual with respect to said additional individuals for providing said service for said individual; and determining, by said computer processor, if a specified perimeter associated with said single location has been crossed by said individual thereby indicating that said individual has left said single location.

12. The method of claim 11, wherein said modified queue list indicates that said service may be currently provided for said individual, and wherein said method further comprises:

generating at a first level, by said computer processor for said individual, an indicator indicating that said service may be currently provided for said individual, wherein said computing device presents said indicator at said first level to said individual; and generating, by said computer processor for said individual, instructions advising said individual to go to a specified location with respect to receiving said service, wherein said computing device presents said instructions to said individual.

13. The method of claim 12, wherein a first time period has elapsed since said generating said indicator, and wherein said method further comprises:

generating at a second level, by said computer processor for said individual, said indicator indicating that said service may be currently provided for said individual, wherein said second level exceeds said first level, and wherein said computing device presents said indicator at said second level to said individual.

14. The method of claim 11, further comprising:

retrieving, by said computer processor, a profile for said individual, wherein said profile comprises a frequent customer identifier for said individual with respect to previous visits to said entity, and wherein said profile further comprises preferences associated with said individual with respect to previous services associated with said previous visits to said entity;

generating, by said computer processor for said individual in response to said preferences, additional options associated with said service and said modified queue list, wherein said computing device presents said additional options to said individual; and receiving, by said computer processor from said individual in response to said additional options, a selection for an additional option of said additional options.

15. The method of claim 14, wherein said generating said modified queue list is further based on said selection for said additional option.

16. The method of claim 14, further comprising:

removing, by said computer processor based on said selection for said additional option, said individual from said modified queue list;

placing, by said computer processor in response to said selection for said additional option and said removing, said individual onto a secondary queue list indicating an order with respect to individuals for said entity providing a secondary service for said individual, wherein said secondary queue list differs from said initial queue list and said modified queue list, and wherein said secondary service differs from said service; and placing, by said computer processor, said secondary queue list within a second memory queue differing from said first memory queue.

17. The method of claim 16, wherein said secondary queue list indicates that said secondary service may be currently provided for said individual, and wherein said method further comprises:

generating at a first level, by said computer processor for said individual, an indicator indicating that said secondary service may be currently provided for said individual, wherein said computing device presents said indicator at said first level to said individual; and generating, by said computer processor for said individual, instructions advising said individual to go to a specified location with respect to receiving said service, wherein said computing device presents said instructions to said individual.

18. The method of claim 11, further comprising:

providing at least one support service for at least one of creating, integrating, hosting, maintaining, and deploying computer-readable code in said computing system, wherein the code in combination with the computing system is capable of performing: said retrieving said ID data, said presenting said status, said receiving said request, said presenting said options, said receiving said selection, and said generating.

19. A method comprising:

placing, by a computer processor of a central computing system in response to retrieving queue data associated with an individual, said individual onto an initial queue list indicating an order with respect to additional individuals for an entity providing a service for said individual, wherein said service is provided for said individual at a single location associated with said entity, wherein said individual is currently located at said single location for said receiving said service, and wherein said initial queue list is stored within a first memory queue;

transmitting, by said computer processor to a computing device, a status of said individual with respect to said initial queue list, wherein said computing device presents said status to said individual;

generating, by said computer processor based on said results of analyzing data associated with said service, options for said individual and a specified amount of time for responding to said options, wherein said options are associated with said service, previous experiences associated with said individual and said entity, different individuals for performing alternative services differing from and associated with said service, and said initial queue list, wherein said computing device presents said options and said specified amount of time to said individual, wherein said options are associated with different wait times for receiving said options, and wherein each option of said options is associated with a different attribute associated with performing said service;

receiving, by said computer processor from said individual, a selection for a first option of said options and a second option of said options, wherein said first option is associated with a first previous experience associated with said individual and said entity, and wherein said second option is associated with a first specified individual for performing an alternative service differing from and associated with said service;

associating, by said computer processor for said individual based on said selection, said first option and said second option with said service and said individual; and determining, by said computer processor, if a specified perimeter associated with said single location has been crossed by said individual thereby indicating that said individual has left said single location.

20. The method of claim 19, further comprising:

placing, by said computer processor, said initial queue list within said first memory queue.

* * * * *